(12) United States Patent
Hayes et al.

(10) Patent No.: US 11,775,400 B2
(45) Date of Patent: Oct. 3, 2023

(54) REDUNDANT PROCESSING FABRIC FOR AUTONOMOUS VEHICLES

(71) Applicant: GHOST AUTONOMY INC., Mountain View, CA (US)

(72) Inventors: John Hayes, Mountain View, CA (US); Volkmar Uhlig, Cupertino, CA (US)

(73) Assignee: GHOST AUTONOMY INC., Mountain View, CA (US)

( * ) Notice: Subject to any disclaimer, the term of this patent is extended or adjusted under 35 U.S.C. 154(b) by 137 days.

(21) Appl. No.: 17/520,824

(22) Filed: Nov. 8, 2021

(65) Prior Publication Data

US 2022/0058096 A1   Feb. 24, 2022

Related U.S. Application Data

(63) Continuation of application No. 16/382,522, filed on Apr. 12, 2019, now Pat. No. 11,176,007.

(51) Int. Cl.
*G06F 11/20* (2006.01)
*G05D 1/00* (2006.01)
*G06F 13/40* (2006.01)

(52) U.S. Cl.
CPC ....... *G06F 11/2023* (2013.01); *G05D 1/0077* (2013.01); *G06F 13/4022* (2013.01); *G06F 2201/805* (2013.01)

(58) Field of Classification Search
CPC .. G06F 11/2023; G06F 11/18; G06F 11/2007; G06F 11/2015; G06F 11/2048; G06F 11/2041; G06F 13/4022; G06F 2201/805; G05D 1/0077; G05D 2201/0213; Y02D 10/00; B60W 50/023; B60W 60/001
See application file for complete search history.

(56) References Cited

U.S. PATENT DOCUMENTS

| | | | |
|---|---|---|---|
| 11,176,007 B2 * | 11/2021 | Hayes | G06F 11/2015 |
| 2007/0164166 A1 | 7/2007 | Hirvonen | |
| 2011/0084162 A1 | 4/2011 | Goossen et al. | |
| 2016/0041935 A1 | 2/2016 | Kinjo | |
| 2016/0237773 A1 | 8/2016 | Dalton et al. | |
| 2016/0359704 A1 | 12/2016 | Gandham et al. | |
| 2016/0368417 A1 | 12/2016 | Bassi et al. | |
| 2018/0144786 A1 | 5/2018 | Lim et al. | |
| 2018/0327091 A1 | 11/2018 | Burks et al. | |
| 2019/0173736 A1 | 6/2019 | Ponnuswamy et al. | |

(Continued)

*Primary Examiner* — Matthew M Kim
*Assistant Examiner* — Matthew N Putaraksa

(57) ABSTRACT

A redundant processing fabric in an autonomous vehicle may include: processing, by a first processing unit of a plurality of processing units, sensor data from a first sensor of a plurality of sensors, where the plurality of processing units are coupled to the plurality of sensors via a switched fabric, wherein the plurality of processing units and plurality of sensors are included in the autonomous vehicle, wherein the sensor data corresponds to an environment external to the autonomous vehicle; determining a failure in processing the sensor data by the first processing unit; and severing, in the switched fabric, a first communications path between the first sensor and the first processing unit; and establishing, in the switched fabric, a second communications path between the first sensor and a redundant processing unit.

17 Claims, 9 Drawing Sheets

(56) References Cited

U.S. PATENT DOCUMENTS

| | | |
|---|---|---|
| 2019/0207818 A1 | 7/2019 | Niestemski et al. |
| 2020/0327023 A1 | 10/2020 | Hayes et al. |
| 2021/0009267 A1 | 1/2021 | Miller |
| 2021/0334151 A1* | 10/2021 | Hayes ................. G06F 11/2028 |
| 2021/0362740 A1* | 11/2021 | Mujica ................ B60W 60/001 |
| 2022/0169270 A1* | 6/2022 | Wei ....................... B60W 50/12 |

* cited by examiner

REDUNDANT PROCESSING FABRIC FOR AUTONOMOUS VEHICLES

CROSS-REFERENCE TO RELATED APPLICATION

This is a continuation application for patent entitled to a filing date and claiming the benefit of earlier-filed U.S. Pat. No. 11,176,007, issued Nov. 16, 2021, herein incorporated by reference in its entirety.

BACKGROUND

Field of the Invention

The field of the invention is data processing in autonomous vehicles, or, more specifically, methods, apparatus, autonomous vehicles, and products for a redundant processing fabric in an autonomous vehicle.

Description of Related Art

Autonomous vehicles operate by detecting their environment via one or more sensors, and making operational decisions based on the state of the autonomous vehicle and the environment. The autonomous vehicles rely on one or more processors to facilitate these decisions. Failure in one of these processors can degrade performance of the autonomous vehicle, and may inhibit autonomous operation.

SUMMARY

A redundant processing fabric in an autonomous vehicle may include: processing, by a first processing unit of a plurality of processing units, sensor data from a first sensor of a plurality of sensors, where the plurality of processing units are coupled to the plurality of sensors via a switched fabric, wherein the plurality of processing units and plurality of sensors are included in the autonomous vehicle; determining a failure in processing the sensor data by the first processing unit; and redirecting, via the switched fabric, sensor data from the first sensor a redundant processing unit.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION

Figure 1:
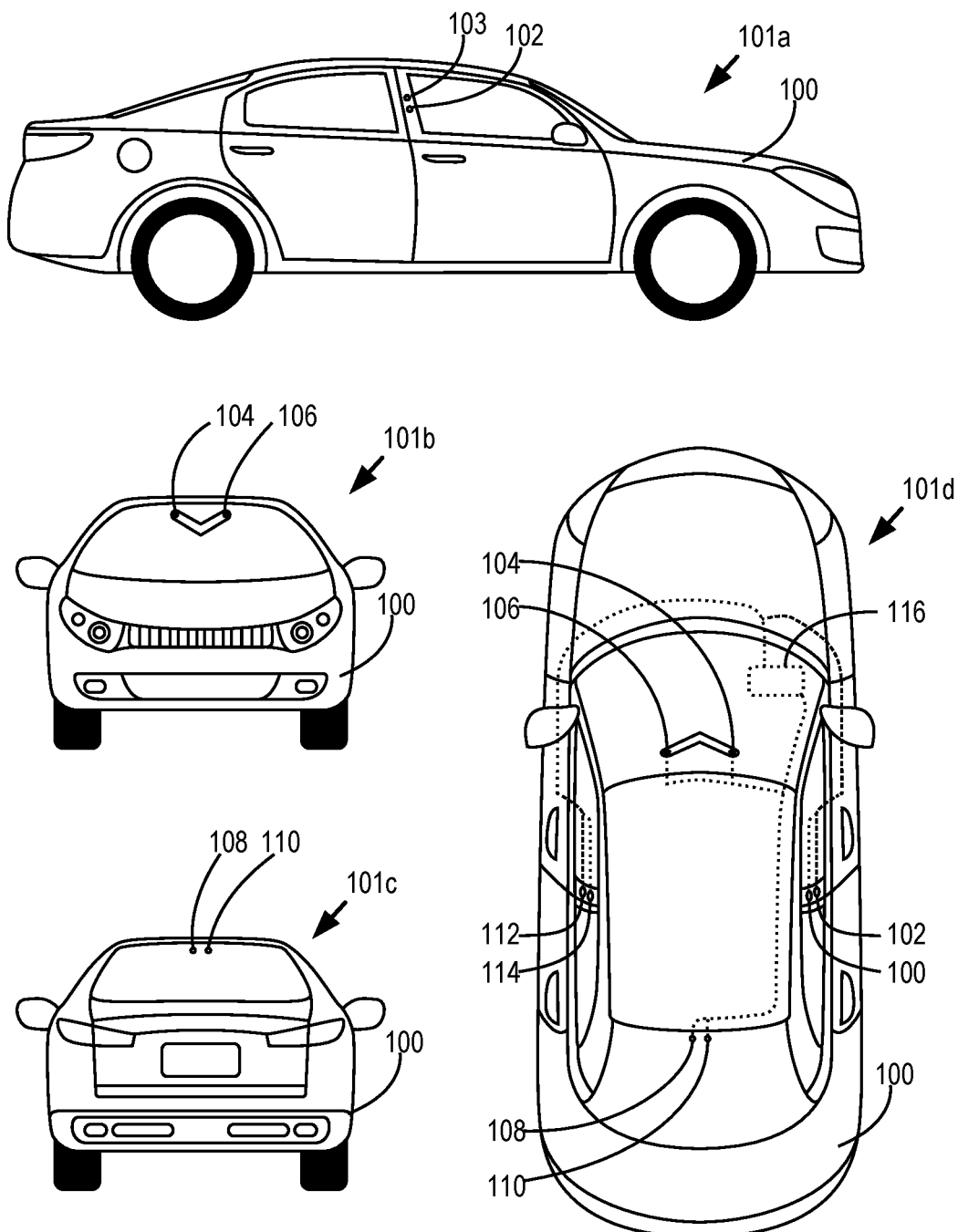
FIG. 1 shows example views of an autonomous vehicle having a redundant processor fabric.

Example methods, apparatus, autonomous vehicles, and products for a redundant processing fabric in an autonomous vehicle are described with reference to the accompanying drawings, beginning with FIG. 1. FIG. 1 shows multiple views of an autonomous vehicle 100 configured with a redundant processing fabric in accordance with some embodiments of the present disclosure. Right side view 101a shows a right side of the autonomous vehicle 100, where sensors 102 and 103 are mounted on or otherwise affixed to the right side of the autonomous vehicle 100. The sensors 102 and 103 that are mounted on or otherwise affixed to the autonomous vehicle 100 may be configured to capture image data, video data, audio data, or any other data (including combinations thereof) that can be used to determine the environmental state of the autonomous vehicle 100 from the perspective of the right side of the autonomous vehicle 100.

Front view 101b shows a front side of the autonomous vehicle 100, where sensors 104 and 106 are mounted on or otherwise affixed to the front side of the autonomous vehicle 100. The sensors 104 and 106 that are mounted on or otherwise affixed to the front side of the autonomous vehicle 100 may be configured to capture image data, video data, audio data, or any other data (including combinations thereof) that can be used to determine the environmental state of the autonomous vehicle 100 from the perspective of the front side of the autonomous vehicle 100.

Rear view 101c shows a rear side of the autonomous vehicle 100, where sensors 108 and 110 are mounted on or otherwise affixed to the rear side of the autonomous vehicle 100. The sensors 108 and 110 that are mounted on or otherwise affixed to the rear side of the autonomous vehicle 100 may be configured to capture image data, video data, audio data, or any other data (including combinations thereof) that can be used to determine the environmental state of the autonomous vehicle 100 from the perspective of the rear side of the autonomous vehicle 100.

Top view 101d shows an overhead view of the autonomous vehicle 100. Shown in the top view 101d are sensors 102-110 as illustrated in previous views, as well as sensors 112 and 114 that are mounted on or otherwise affixed to the left side of the autonomous vehicle 100. The sensors 112 and 114 that are mounted on or otherwise affixed to the left side of the autonomous vehicle 100 may be configured to capture image data, video data, audio data, or any other data (including combinations thereof) that can be used to determine the environmental state of the autonomous vehicle 100 from the perspective of the left side of the autonomous vehicle 100. Readers will appreciate that the placement of the sensors 102-114 is merely for illustrative purposes and in no way represents a limitation on the arrangement of sensors, the manner in which the sensors are attached to the autonomous vehicle 100, and so on.

Further shown in the top view 101d is an automation computing system 116. The automation computing system 116 can include one or more computing devices configured to evaluate the environmental state of the autonomous vehicle 100, control one or more autonomous operations (e.g., autonomous driving operations) of the autonomous vehicle 100 in coordination with other components of the autonomous vehicle 100, and perform other tasks as will be explained in greater detail below. In such an example, the one or more computing devices may be configured to control one or more autonomous operations of the autonomous vehicle 100 through the use of one or more modules of computer program instructions that are executing on one or more of the computing devices. For example, the automation computing system 116 may be configured to process sensor data (e.g., data from the sensors 102-114 and potentially other sensors), operational data (e.g., a speed, acceleration, gear, orientation, turning direction), and other data to determine an operational state and/or operational history of the autonomous vehicle. The automation computing system 116 may then determine one or more operational commands for the autonomous vehicle (e.g., a change in speed or acceleration, a change in brake application, a change in gear, a change in turning or orientation, etc.) that may be effected via coordination between the automation computing system 116 and other components within the autonomous vehicle 100. For example, the automation computing system 116 may be coupled, directly or indirectly, for data communications with a device that can control the operation of a steering system within the autonomous vehicle 100. In such an example, if an analysis of sensor data causes the automation computing system 116 to determine that the direction of the autonomous vehicle 100 should be altered, the automation computing system 116 may issue one or more commands to the device that can control the operation of the steering system within the autonomous vehicle 100, thereby causing the device that can control the operation of a steering system within the autonomous vehicle 100 to change the direction of the autonomous vehicle by manipulating the steering system within the autonomous vehicle 100. The automation computing system 116 may also capture and store sensor data. Operational data of the autonomous vehicle may also be stored in association with corresponding sensor data, thereby indicating the operational data of the autonomous vehicle 100 at the time the sensor data was captured.

Although the autonomous vehicle 100 if FIG. 1 is shown as car, it is understood that autonomous vehicles 100 in accordance with embodiments of the present disclosure may also include other vehicles, including motorcycles, planes, helicopters, unmanned aerial vehicles (UAVs, e.g., drones), or other vehicles as can be appreciated. Moreover, it is understood that additional sensors or other external sensors may also be included in the autonomous vehicle 100.

Figure 2:
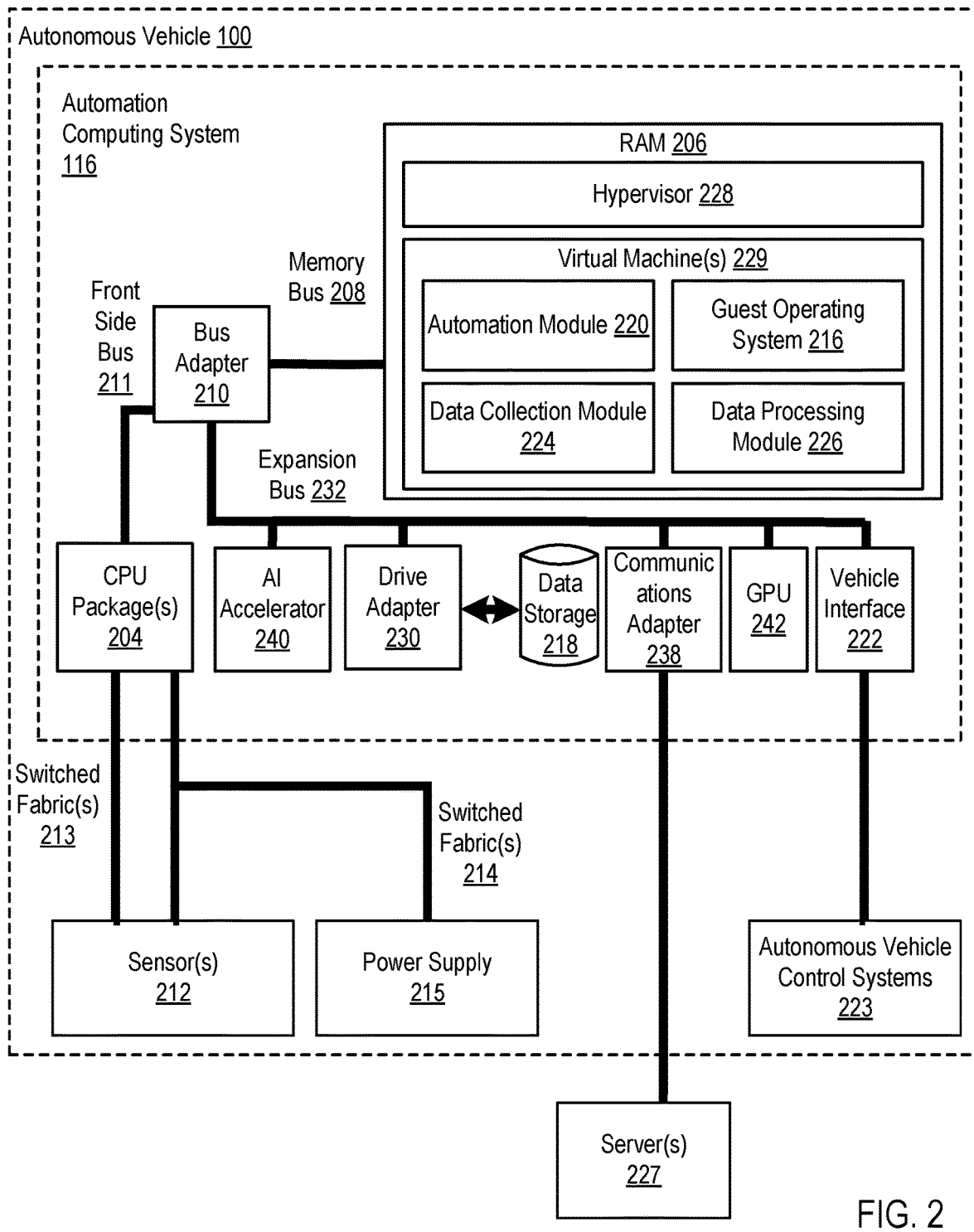
FIG. 2 is block diagram of an autonomous computing system for a redundant processor fabric in an autonomous vehicle.

For further explanation, FIG. 2 sets forth a block diagram of automated computing machinery comprising an exemplary automation computing system 116 according to some embodiments of the present disclosure. The automation computing system 116 of FIG. 2 includes at least one computer Central Processing Unit (CPU') package 204 as well as random access memory 206 (RAM') which is connected through a data communications link (e.g., a bus) to the CPU packages 204 and to other components of the automation computing system 116.

A CPU package 204 may comprise a plurality of processing units. For example, each CPU package 204 may comprise a logical or physical grouping of a plurality of processing units. Each processing unit may be allocated a particular process for execution. Moreover, each CPU package 204 may comprise one or more redundant processing units. A redundant processing unit is a processing unit not allocated a particular process for execution unless a failure occurs in another processing unit. For example, when a given processing unit allocated a particular process fails, a redundant processing unit may be selected and allocated the given process. A process may be allocated to a plurality of processing units within the same CPU package 204 or different CPU packages 204. For example, a given process may be allocated to a primary processing unit in a CPU package 204. The results or output of the given process may be output from the primary processing unit to a receiving process or service. The given process may also be executed in parallel on a secondary processing unit. The secondary processing unit may be included within the same CPU package 204 or a different CPU package 204. The secondary processing unit may not provide its output or results of the process until the primary processing unit fails. The receiving process or service may then receive data from the secondary processing unit and a redundant processing unit may then be selected and have allocated the given process to ensure that two or more processing units are allocated the given process for redundancy and increased reliability.

The CPU packages 204 are communicatively coupled to one or more sensors 212. The sensors 212 may be configured to capture sensor data describing the operational and environmental conditions of an autonomous vehicle. For example, the sensors 212 may include sensors (e.g., the sensors 102-114 of FIG. 1), accelerometers, Global Positioning System (GPS) radios, Lidar sensors, or other sensors as can be appreciated. Although the sensors 212 are shown as being external to the automation computing system 116, it is understood that one or more of the sensors 212 may reside as a component of the automation computing system 212 (e.g., on the same board, within the same housing or chassis). The sensors 212 may be communicatively coupled with the CPU packages 204 via a switched fabric 213.

The switched fabric 213 comprises a communications topology through which the CPU packages 204 and sensors 212 are coupled via a plurality of switching mechanisms (e.g., latches, switches, crossbar switches, field programmable gate arrays (FPGAs), etc.). For example, the switched fabric 213 may implement a mesh connection connecting the CPU packages 204 and sensors 212 as endpoints, with the switching mechanisms serving as intermediary nodes of the mesh connection. The CPU packages 204 and sensors 212 may be in communication via a plurality of switched fabrics 213. For example, each of the switched fabrics 213 may include the CPU packages 204 and sensors 212, or a subset of the CPU packages 204 and sensors 212, as endpoints. Each switched fabric 213 may also comprise a respective plurality of switching components. The switching components of a given switched fabric 213 may be independent (e.g., not connected) of the switching components of other switched fabrics 213 such that only switched fabric 213 endpoints (e.g., the CPU packages 204 and sensors 212) are overlapping across the switched fabrics 213. This provides redundancy such that, should a connection between a CPU package 204 and sensor 212 fail in one switched fabric 213, the CPU package 204 and sensor 212 may remain connected via another switched fabric 213. Moreover, in the event of a failure in a CPU package 204, a processor of a CPU package 204, or a sensor, a communications path excluding the failed component and including a functional redundant component may be established.

The CPU packages 204 and sensors 212 are configured to receive power from one or more power supplies 215. The power supplies 215 may comprise an extension of a power system of the autonomous vehicle 100 or an independent power source (e.g., a battery). The power supplies 215 may supply power to the CPU packages 204 and sensors 212 by another switched fabric 214. The switched fabric 214 provides redundant power pathways such that, in the event of a failure in a power connection, a new power connection pathway may be established to the CPU packages 204 and sensors 214.

Stored in RAM 206 is an automation module 220. The automation module 220 may be configured to process sensor data from the sensors 212 to determine one or more operational commands for an autonomous vehicle 100 to affect the movement, direction, or other function of the autonomous vehicle 100, thereby facilitating autonomous driving or operation of the vehicle. Such operational commands may include a change in the speed of the autonomous vehicle 100, a change in steering direction, a change in gear, or other command as can be appreciated. For example, the automation module 220 may provide sensor data and/or processed sensor data as one or more inputs to a trained machine learning model (e.g., a trained neural network) to determine the one or more operational commands. The operational commands may then be communicated to autonomous vehicle control systems 223 via a vehicle interface 222. The autonomous vehicle control systems 223 are configured to affect the movement and operation of the autonomous vehicle 100. For example, the autonomous vehicle control systems 223 may turn or otherwise change the direction of the autonomous vehicle 100, accelerate or decelerate the autonomous vehicle 100, change a gear of the autonomous vehicle 100, or otherwise affect the movement and operation of the autonomous vehicle 100.

Further stored in RAM 206 is a data collection module 224 configured to process and/or store sensor data received from the one or more sensors 212. For example, the data collection module 224 may store the sensor data as captured by the one or more sensors 212, or processed sensor data 212 (e.g., sensor data 212 having object recognition, compression, depth filtering, or other processes applied). Such processing may be performed by the data collection module 224 in real-time or in substantially real-time as the sensor data is captured by the one or more sensors 212. The processed sensor data may then be used by other functions or modules. For example, the automation module 220 may use processed sensor data as input to determine one or more operational commands. The data collection module 224 may store the sensor data in data storage 218.

Also stored in RAM 206 is a data processing module 226. The data processing module 226 is configured to perform one or more processes on stored sensor data (e.g., stored in data storage 218 by the data collection module 218) prior to upload to a server 227. Such operations can include filtering, compression, encoding, decoding, or other operations as can be appreciated. The data processing module 226 may then communicate the processed and stored sensor data to the server 227. Readers will appreciate that although the embodiment depicted in FIG. 2 relates to an embodiment where the data processing module 226 communicates the processed and stored sensor data to the server 227, in other embodiments, the data processing module 226 may communicate with other types of environments such a cloud computing environment, data warehouse, or any other endpoint that may receive data from the autonomous vehicle 100.

Further stored in RAM 206 is a hypervisor 228. The hypervisor 228 is configured to manage the configuration and execution of one or more virtual machines 229. For example, each virtual machine 229 may emulate and/or simulate the operation of a computer. Accordingly, each virtual machine 229 may comprise a guest operating system 216 for the simulated computer. The hypervisor 228 may manage the creation of a virtual machine 229 including installation of the guest operating system 216. The hypervisor 228 may also manage when execution of a virtual machine 229 begins, is suspended, is resumed, or is terminated. The hypervisor 228 may also control access to computational resources (e.g., processing resources, memory resources, device resources) by each of the virtual machines.

Each of the virtual machines 229 may be configured to execute one or more of the automation module 220, the data collection module 224, the data processing module 226, or combinations thereof. Moreover, as is set forth above, each of the virtual machines 229 may comprise its own guest operating system 216. Guest operating systems 216 useful in autonomous vehicles in accordance with some embodiments of the present disclosure include UNIX™, Linux™, Microsoft Windows™, AIX™, IBM's i OS™, and others as will occur to those of skill in the art. For example, the autonomous vehicle 100 may be configured to execute a first operating system when the autonomous vehicle is in an autonomous (or even partially autonomous) driving mode and the autonomous vehicle 100 may be configured to execute a second operating system when the autonomous vehicle is not in an autonomous (or even partially autonomous) driving mode. In such an example, the first operating system may be formally verified, secure, and operate in real-time such that data collected from the sensors 212 are processed within a predetermined period of time, and autonomous driving operations are performed within a predetermined period of time, such that data is processed and acted upon essentially in real-time. Continuing with this example, the second operating system may not be formally verified, may be less secure, and may not operate in real-time as the tasks that are carried out (which are described in greater detail below) by the second operating system are not as time-sensitive the tasks (e.g., carrying out self-driving operations) performed by the first operating system.

Readers will appreciate that although the example included in the preceding paragraph relates to an embodiment where the autonomous vehicle 100 may be configured to execute a first operating system when the autonomous vehicle is in an autonomous (or even partially autonomous) driving mode and the autonomous vehicle 100 may be configured to execute a second operating system when the autonomous vehicle is not in an autonomous (or even partially autonomous) driving mode, other embodiments are within the scope of the present disclosure. For example, in another embodiment one CPU (or other appropriate entity such as a chip, CPU core, and so on) may be executing the first operating system and a second CPU (or other appropriate entity) may be executing the second operating system, where switching between these two modalities is accomplished through fabric switching, as described in greater detail below. Likewise, in some embodiments, processing resources such as a CPU may be partitioned where a first partition supports the execution of the first operating system and a second partition supports the execution of the second operating system.

The guest operating systems 216 may correspond to a particular operating system modality. An operating system modality is a set of parameters or constraints which a given operating system satisfies, and are not satisfied by operating systems of another modality. For example, a given operating system may be considered a "real-time operating system" in that one or more processes executed by the operating system must be performed according to one or more time constraints. For example, as the automation module 220 must make determinations as to operational commands to facilitate autonomous operation of a vehicle. Accordingly, the automation module 220 must make such determinations within one or more time constraints in order for autonomous operation to be performed in real time. The automation module 220 may then be executed in an operating system (e.g., a guest operating system 216 of a virtual machine 229) corresponding to a "real-time operating system" modality. Conversely, the data processing module 226 may be able to perform its processing of sensor data independent of any time constrains, and may then be executed in an operating system (e.g., a guest operating system 216 of a virtual machine 229) corresponding to a "non-real-time operating system" modality.

As another example, an operating system (e.g., a guest operating system 216 of a virtual machine 229) may comprise a formally verified operating system. A formally verified operating system is an operating system for which the correctness of each function and operation has been verified with respect to a formal specification according to formal proofs. A formally verified operating system and an unverified operating system (e.g., one that has not been formally verified according to these proofs) can be said to operate in different modalities.

The automation module 220, data collection module 224, data collection module 224, data processing module 226, hypervisor 228, and virtual machine 229 in the example of FIG. 2 are shown in RAM 206, but many components of such software typically are stored in non-volatile memory also, such as, for example, on data storage 218, such as flash storage. Moreover, any of the automation module 220, data collection module 224, and data processing module 226 may be executed in a virtual machine 229 and facilitated by a guest operating system 216 of that virtual machine 229.

The exemplary automation computing system 116 of FIG. 2 includes a communications adapter 238 for data communications with other computers and for data communications with a data communications network. Such data communications may be carried out through data communications networks such as IP data communications networks, and in other ways as will occur to those of skill in the art. Communications adapters implement the hardware level of data communications through which one computer sends data communications to another computer, directly or through a data communications network. Examples of communications adapters useful in autonomous vehicle according to some embodiments of the present disclosure include 802.11 adapters for wireless data communications, mobile adapters (e.g., 4G communications adapters, LTE communications adapters, 5G communications adapters) for mobile data communications, and others. For example, the automation computing system 116 may communicate with one or more remotely disposed servers 227, or other communications endpoint as described above, via the communications adapter 238.

The exemplary automation computing system of FIG. 2 also includes one or more Artificial Intelligence (AI) accelerators 240. The AI accelerator 240 provides hardware-based assistance and acceleration of AI-related functions, including machine learning, computer vision, etc. Accordingly, performance of any of the automation module 220, data collection module 224, data processing module 226, or other operations of the automation computing system 116 may be performed at least in part by the AI accelerators 240.

The exemplary automation computing system of FIG. 2 also includes one or more graphics processing units (GPUs) 242. The GPUs 242 are configured to provide additional processing and memory resources for processing image and/or video data, including encoding, decoding, etc. Accordingly, performance of any of the automation module 220, data collection module 224, data processing module 226, or other operations of the automation computing system 116 may be performed at least in part by the GPUs 242.

Figure 3:
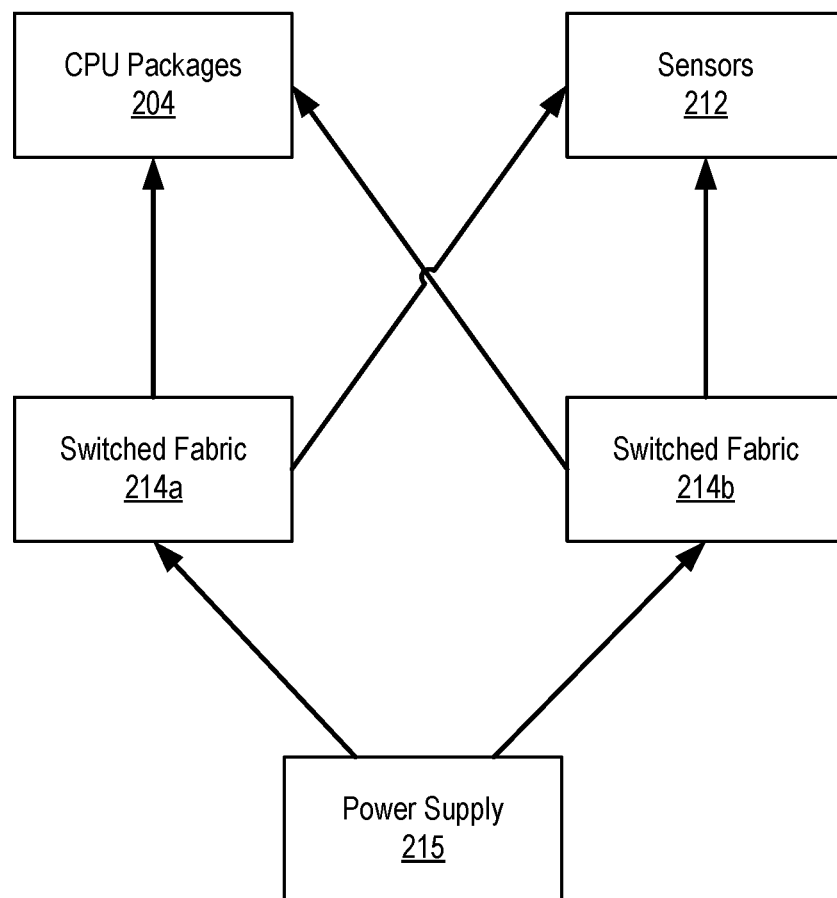
FIG. 3 is a block diagram of a redundant power fabric for an autonomous vehicle having a redundant processor fabric.

FIG. 3 shows an example redundant power fabric for an autonomous vehicle having a redundant processor fabric. The redundant power fabric provides redundant pathways for power transfer between the power supplies 215, the sensors 212, the CPU packages 204, and may also be used for power transfer to other components not explicitly depicted in FIG. 3. In this example, the power supplies 215 are coupled to the sensors 212 and CPU packages via two switched fabrics 214a and 214b, although additional redundant resources may be incorporated in accordance with other embodiments of the present disclosure. The topology shown in FIG. 3 provides redundant pathways between the power supplies 215, the sensors 212, and the CPU packages 204 such that power can be rerouted through any of multiple pathways in the event of a failure in an active connection pathway. The switched fabrics 214a and 214b may provide power to the sensors 212 using various connections, including Mobile Industry Processor Interface (MIPI), Inter-Integrated Circuit (I2C), Universal Serial Bus (USB), or another connection. The switched fabrics 214a and 214b may also provide power to the CPU packages 204 using various connections, including Peripheral Component Interconnect Express (PCIe), USB, or other connections. Although only two switched fabrics 214a and 214b are shown connecting the power supplies 215 to the sensors 212 and CPU packages 204, it is understood that the approach shown by FIG. 3 can be modified to include additional switched fabrics 214.

Figure 4:
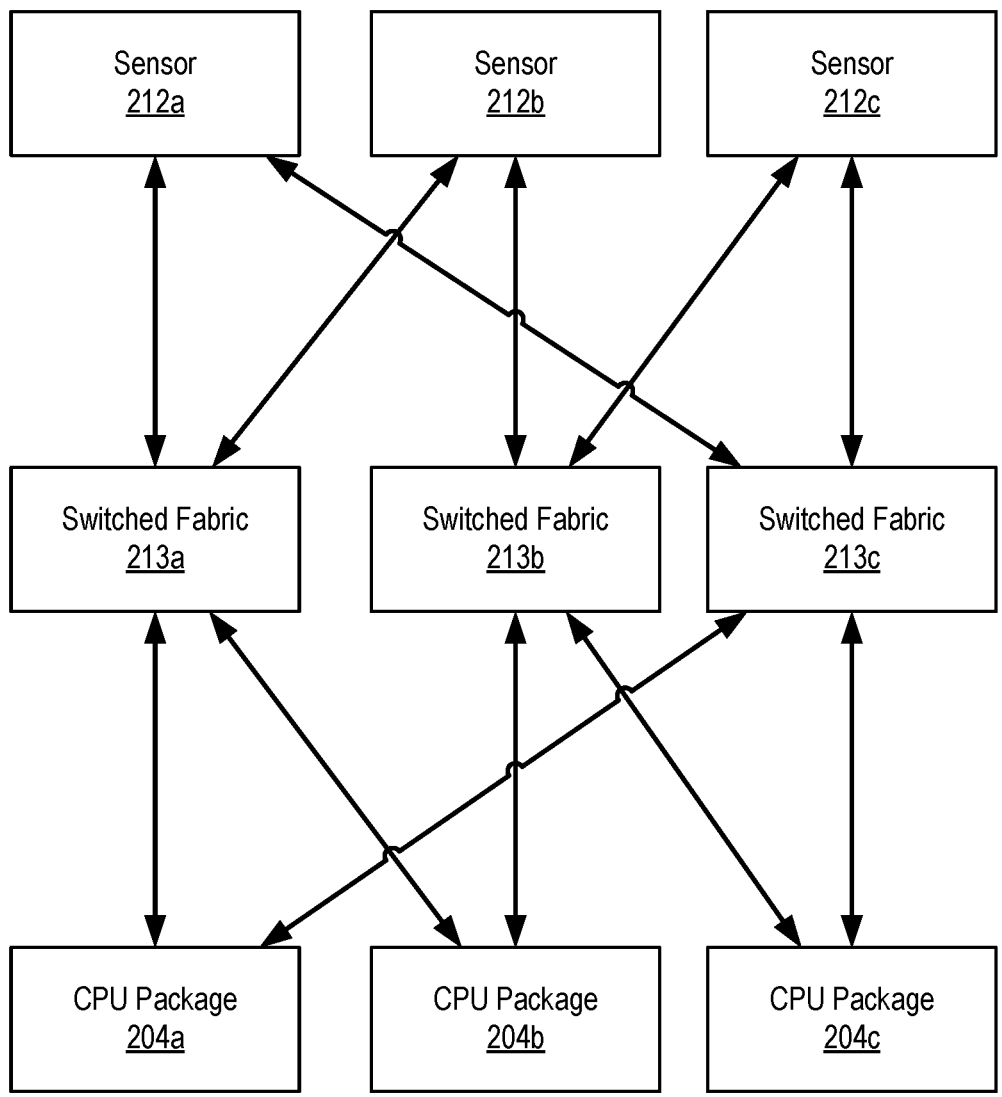
FIG. 4 is a block diagram of a redundant data fabric for an autonomous vehicle having a redundant processor fabric.

FIG. 4 is an example redundant data fabric for an autonomous vehicle having a redundant processor fabric. The redundant data fabric provides redundant data connection pathways between sensors 212 and CPU packages 204, and may also provide redundant data connection pathways between other components not explicitly depicted in FIG. 4. In this example view, three CPU packages 204a, 204b, and 204c are connected to three sensors 212a, 212b, and 212c via three switched fabrics 213a, 213b, and 213c. Each CPU package 204a, 204b, and 204c is connected to a subset of the switched fabrics 213a, 213b, and 213c. For example, CPU package 204a is connected to switched fabrics 213a and 213c, CPU package 204b is connected to switched fabrics 213a and 213b, and CPU package 204c is connected to switched fabrics 213b and 213c. Each switched fabric 213a, 213b, and 213c is connected to a subset of the sensors 212a, 212b, and 212c. For example, switched fabric 213a is connected to sensors 212a and 212b, switched fabric 213b is connected to sensor 212b and 212c, and switched fabric 213c is connected to sensors 212a and 212c. Under this topology, each CPU package 204a, 204b, and 204c has an available connection path to any sensor 212a, 212b, and 212c. It is understood that the topology of FIG. 4 is exemplary, and that CPU packages, switched fabrics, sensors, or connections between components may be added or removed while maintaining redundancy as can be appreciated by one skilled in the art.

Figure 5:
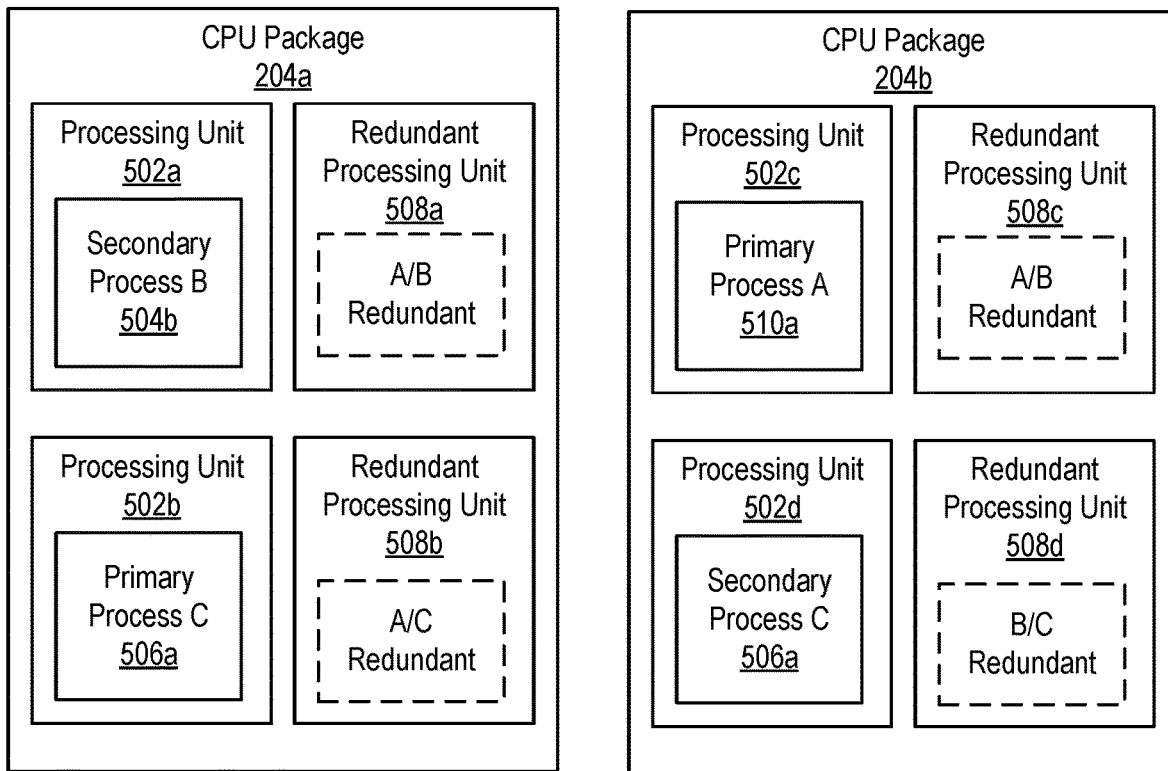
FIG. 5 is an example view of process allocation across CPU packages for a redundant processor fabric in an autonomous vehicle.
Figure 5:
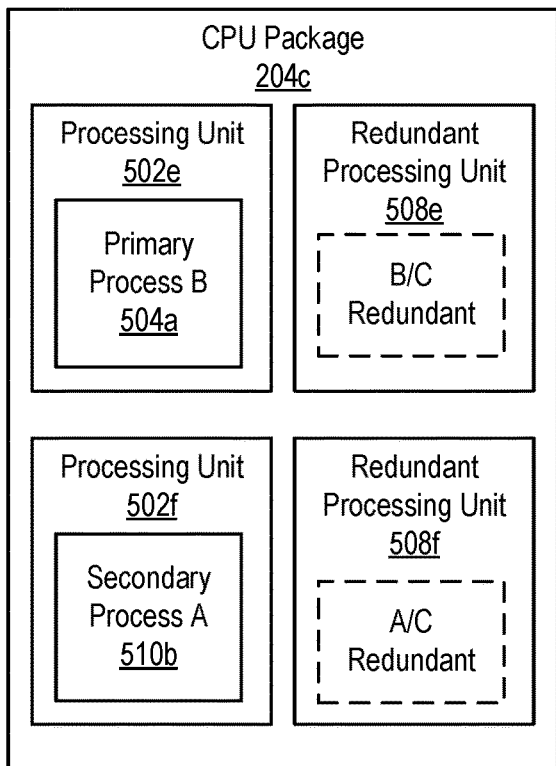

FIG. 5 is an example view of process allocation across CPU packages for a redundant processing fabric in an autonomous vehicle. Shown are three CPU packages 204a, 204b, and 204c. Each CPU package 204a includes a processing unit that has been allocated (e.g., by a hypervisor 228 or other process or service) primary execution of a process and another processing unit that has been allocated secondary execution of a process. As set forth herein, primary execution of a process describes an executing instance of a process whose output will be provided to another process or service. Secondary execution of the process describes executing an instance of the process in parallel to the primary execution, but the output may not be output to the other process or service. For example, in CPU package 204a, processing unit 502a has been allocated secondary execution of "process B," denoted as secondary process B 504b, while processing unit 502b has been allocated primary execution of "process C," denoted as primary process C 506a.

CPU package 204a also comprises two redundant processing units that are not actively executing a process A, B, or C, but are instead reserved in case of failure of an active processing unit. Redundant processing unit 508a has been reserved as "A/B redundant," indicating that reserved processing unit 508a may be allocated primary or secondary execution of processes A or B in the event of a failure of a processing unit allocated the primary or secondary execution of these processes. Redundant processing unit 508b has been reserved as "A/C redundant," indicating that reserved processing unit 508b may be allocated primary or secondary execution of processes A or C in the event of a failure of a processing unit allocated the primary or secondary execution of these processes.

CPU package 204b includes processing unit 502c, which has been allocated primary execution of "process A," denoted as primary process A 510a, and processing unit 502d, which has been allocated secondary execution of "process C," denoted as secondary process C 506a. CPU package 204b also includes redundant processing unit 508c, reserved as "AB redundant," and redundant processing unit 508d, reserved as "B/C redundant." CPU package 204c includes processing unit 502e, which has been allocated primary execution of "process B," denoted as primary process B 504a, and processing unit 502f, which has been allocated secondary execution of "process A," denoted as secondary process A 510a. CPU package 204c also includes redundant processing unit 508e, reserved as "B/C redundant," and redundant processing unit 508f, reserved as "A/C redundant."

As set forth in the example view of FIG. 5, primary and secondary instances of processes A, B, and C are each executed in an allocated processing unit. Thus, if a processing unit performing primary execution of a given process fails, the processing unit performing secondary execution may instead provide output of the given process to a receiving process or service. Moreover, the primary and secondary execution of a given process are executed on different CPU packages. Thus, if an entire processing unit fails, execution of each of the processes can continue using one or more processing units handling secondary execution. The redundant processing units 508a-f allow for allocation of primary or secondary execution of a process in the event of processing unit failure. This further prevents errors caused by processing unit failure as parallel primary and secondary execution of a process may be restored. One skilled in the art would understand that the number of CPU packages, processing units, redundant processing units, and processes may be modified according to performance requirements while maintaining redundancy.

Figure 6:
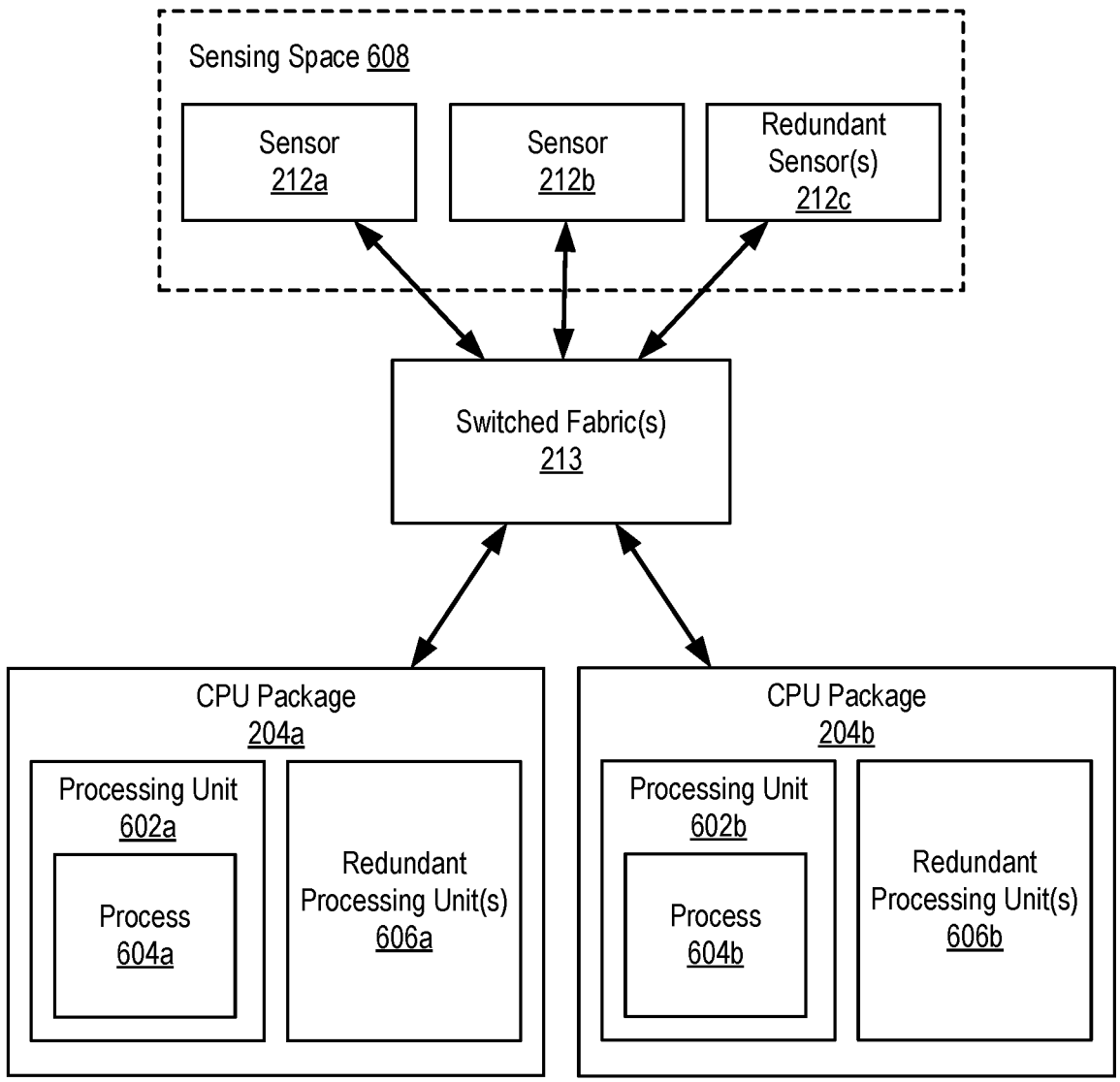
FIG. 6 is an example view of a redundant processing fabric in an autonomous vehicle.

FIG. 6 is an example view of a redundant communications pathway for a redundant processing fabric in an autonomous vehicle. Shown in this example are CPU packages 204a and 204b, which include processing units 602a and 602b, respectively. Processing unit 602a has been allocated execution of process 604a (e.g., by a hypervisor 228, or another process or service), and processing unit 602a has been allocated execution of process 604b. It is understood that the inclusion of processing units 602a and 602b is merely exemplary, and that CPU packages 204a and 204b may also include additional processing units, each of which may be allocated execution of additional processes. CPU packages 204a and 204b also each include redundant processing units 606a and 606b, respectively, which are processing units not yet allocated execution of a particular process.

CPU packages 204a and 204b are coupled to a switched fabric 213. The switched fabric 213 is also coupled to sensors 212a, 212b, and one or more redundant sensors 212c. A redundant sensor 212c is a sensor 212 whose output is not actively being processed (e.g., stored, encoded, or otherwise processed) by a process executed on a CPU package. For example, a redundant sensor 212c may be uninitialized, initialized but inactive, or otherwise redundant. The sensors 212a and 212b, and redundant sensors 212c are each associated with a same sensing space 608. A sensing space 608 is a shared targeted area or attribute for capture by a sensor 212. For example, a sensing space 608 for sensors 212 may comprise a same targeted area, a same or similar focal line, a same or similar field of view, or other similar area (e.g., installed on the same side of an autonomous vehicle 100). As another example, a plurality of accelerometer sensors 212 would share the sensing space 608 of the acceleration of a particular body (e.g., an autonomous vehicle 100).

Processes 604a and 604b may comprise separately executed instances of a same process for processing sensor data associated with the same sensing space 608. For example, process 604a may be configured to process sensor data from sensor 212a, while process 604b may be configured to process sensor data from sensor 212b. Accordingly, the switched fabric 213 may comprise a first communications pathway between the sensor 212a and the processing unit 602a and a second communications pathway between the CPU sensor 212b and the processing unit 602b.

In this example, output from processing unit 602a (e.g., from process 604a) may be sent to a receiving process (e.g., a process of an automation module 220, a process of a data collection module 224, or another process or service). Output from processing unit 602b (e.g., from process 604b) may be sent to the receiving process, but not actively acted upon by the receiving process. For example, the receiving process may ignore or drop output from processing unit 602b. Thus, processing units 602a and 602b process sensor data in parallel, but the receiving process only acts upon (e.g., processes) the output from the process 604a. In other words, process 604a may comprise a primary execution of a given process, while process 604b comprises a secondary execution of the given process.

A failure in processing sensor data (e.g., from the sensor 212a) by the processing unit 602a may be determined (e.g., by a hypervisor 228, the receiving process, or another process or service). Determining the failure may comprise determining that the processing unit 602a has failed to provide, within a predefined time limit, an output associated with processing the sensor data. For example, assume that a receiving process is executed in an operating system (e.g., a guest operating system 216 of a virtual machine 229) operating in a "real-time" modality. In other words, the operating system, and by extension the receiving process, is configured to operate within one or more time constraints. As an example, the receiving process may be associated with an automation module 220 configured to determine, in substantially real time, operational commands for the autonomous operation of an autonomous vehicle 100. To do so, the automation module 220 must make decisions within one or more time constraints to ensure that the determined operational commands reflect the most recently captured state of the autonomous vehicle 100. Accordingly, one or more of the process 604a, the automation module 220, or an external monitoring service may determine that the processing unit 602a has failed to provide, within the predefined time limit, the output associated with processing the sensor data.

In response to the failure, the switched fabric 213 may redirect sensor data from the sensor 212a (e.g., the sensor 212 associated with the failed processing unit 602a) to a redundant processing unit 606a or 606b. Redirecting the sensor data from the sensor 212a to the redundant processing unit 606a or 606b may comprise sending (e.g., by the process or service that determined the failure, or another entity) one or more signals to one or more switching mechanisms in the switched fabric 213 to establish a communications pathway between the sensor 212a and the redundant processing unit 606a or 606b. Redirecting the sensor data from the sensor 212a to the redundant processing unit 606a or 606b may comprise sending one or more signals to one or more switching mechanisms in the switched fabric 213 to remove, break, or disrupt a communications pathway between the sensor 212a and the failed processing unit 602a.

Redirecting the sensor data may comprise selecting a redundant processing unit 606a or 606b to which the sensor data may be redirected. For example, one or more of the redundant processing units 606a or 606b may have been reserved (e.g., by a hypervisor 228, or another process) in association with a particular process. In other words, in the event that a processing unit associated with a particular process fails, a redundant processing unit reserved for that particular process will be selected. A redundant processing unit 606a or 606b may also be preferentially selected based on in which CPU package 204a or 204b it is included. For example, in the event of a failure of a processing unit in a given CPU package, a redundant processing unit from a different CPU package may be preferentially selected. This prevents future failures that may be tied to the CPU package as a whole that included the failed processing unit.

Redirecting sensor data from the sensor 212a to a redundant processing unit 606a or 606b may also comprise executing an instance of a process (e.g., process 604a) that was executed on the failed processing unit 602a. Accordingly, the redundant processing unit 606a or 606b may then process the sensor data from the sensor 212a, and redundant execution of processes 604a and 604b is maintained. The redundant processing unit 606a or 606b executing the process 604a may require time to build up an adequate history for processing the sensor data (e.g., through cached data, instruction pipelines, stacks, etc. Accordingly, in response to the failure of the processing unit 606a, the processing unit 606b may provide output (e.g., of the process 604b) to the receiving process. Thus, a continual output of processed sensor data associated with the sensing space 608 is provided to the receiving process.

Figure 7:
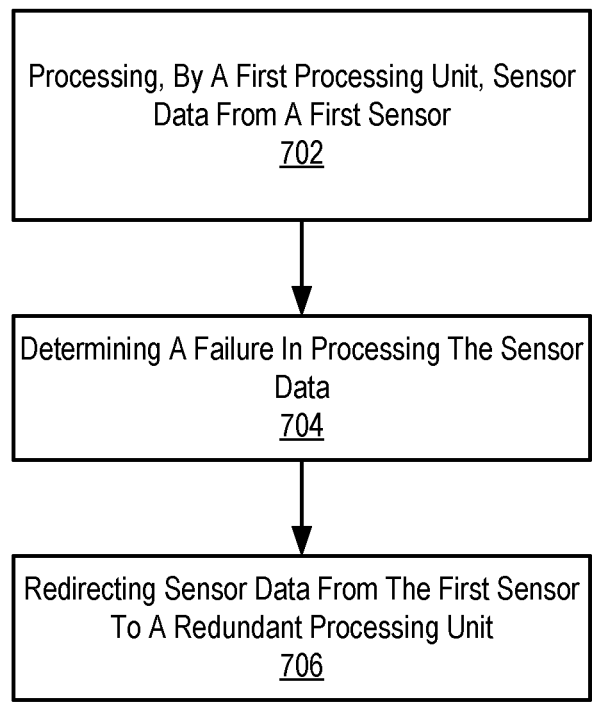
FIG. 7 is a flowchart of an example method for a redundant processing fabric in an autonomous vehicle.

For further explanation, FIG. 7 sets forth a flow chart illustrating an exemplary method for a redundant processing fabric in an autonomous vehicle that includes processing 702, by a first processing unit (e.g., a processing unit 604a), sensor data from a first sensor (e.g., a sensor 212a). The sensor may comprise one of a plurality of sensors. The plurality of sensors may be associated with a same sensing space 608 (e.g., a same targeted area of sensing, a same recorded or detected attribute). For example, the plurality of sensors may comprise a plurality of sensors installed on the same side of an autonomous vehicle (e.g., left side, right side, front side, rear side). As another example, the plurality of sensors may comprise a plurality of sensors measuring the same operational attribute of the autonomous vehicle (e.g., speed, acceleration, GPS location, etc.). The processing unit may comprise one of a plurality of processing units. The plurality of sensors may be coupled to the plurality of processing units by a switched fabric 213. The switched fabric 213 may comprise a plurality of switched fabrics 213.

Processing the sensor data from the first sensor may comprise storing or encoding the sensor data (e.g., encoding, storing, or capturing image data, recording a state of acceleration or speed, recording a GPS location, etc.). Processing the sensor data may also comprise analyzing or deriving one or more attributes from the sensor data (e.g., performing object detection, depth filtering, etc.).

The method of FIG. 7 may further comprise determining 704 a failure in processing the sensor data by the first processing unit. For example, a service or process (e.g., a hypervisor 228, or another process) may determine the failure in processing the sensor data by the first processing unit.

The method of FIG. 7 may further comprise redirecting 706 sensor data from the first sensor to a redundant processing unit (e.g., via the switched fabric 213). Redirecting the sensor data from the first sensor to the redundant processing unit may comprise sending (e.g., by the process or service that determined the failure, or another entity) one or more signals to one or more switching mechanisms in the switched fabric 213 to establish a communications pathway between the first sensor and the redundant processing unit. Redirecting the sensor data from the first sensor to the redundant processing unit may comprise sending one or more signals to one or more switching mechanisms in the switched fabric 213 to remove, break, or disrupt a communications pathway between the first failed first processing unit. In other words, the sensor data from the first sensor is directed to the redundant processing unit instead of the failed first processing unit.

Redirecting the sensor data may comprise selecting a redundant processing unit which the sensor data may be redirected. For example, one or more of the redundant processing units may have been reserved (e.g., by a hypervisor 228, or another process) in association with a particular process. In the event that a processing unit associated with a particular process fails, a redundant processing unit reserved for that particular process will be selected. Accordingly, redirecting the sensor data from the first sensor to the redundant processing unit may comprise selecting, as the redundant processing unit, a redundant processing unit reserved in association with a process allocated for execution by the failed first processing unit. A redundant processing unit may also be preferentially selected based on a CPU package 204 in which it is included. For example, in the event of a failure of a processing unit in a given CPU package, a redundant processing unit from a different CPU package may be preferentially selected. This prevents future failures that may be tied to the CPU package as a whole that included the failed processing unit. Accordingly redirecting the sensor data from the first sensor to the redundant processing unit may comprise selecting, as the redundant processing unit, a redundant processing unit included in a CPU package distinct from a CPU package including the failed first processing unit.

Redirecting the sensor data from the first sensor to the redundant processing unit may comprise executing an instance of a process that was executed on the failed first processing unit. Accordingly, the redundant processing unit may then process the sensor data from the first sensor.

Figure 8:
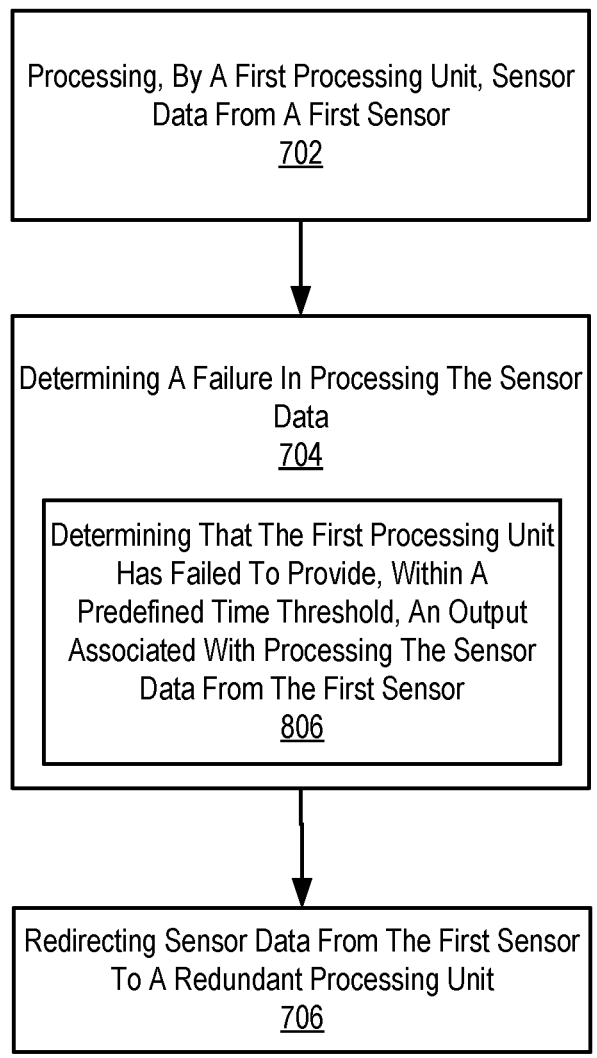
FIG. 8 is a flowchart of an example method for a redundant processing fabric in an autonomous vehicle.

For further explanation, FIG. 8 sets forth a flow chart illustrating an exemplary method for a redundant processing fabric in an autonomous vehicle that includes processing 702, by a first processing unit, sensor data from a first sensor; determining 704 a failure in processing the sensor data; and redirecting 706 sensor data from the first sensor to a redundant processing unit. FIG. 8 differs from FIG. 7 in that determining 704 a failure in processing the sensor data comprises determining 806 that the first processing unit has failed to provide, within a predefined time threshold, an output (e.g., processed sensor data, one or more values derived from the sensor data) associated with processing the sensor data from the first sensor.

For example, assume that a process configured to receive output from the first processing unit is executed in an operating system (e.g., a guest operating system 226 of a virtual machine 229) operating in a "real-time" modality. In other words, the operating system, and by extension the receiving process, is configured to operate within one or more time constraints. As an example, the receiving process may be associated with an automation module 220 configured to determine, in substantially real time, operational commands for the autonomous operation of an autonomous vehicle 100. To do so, the automation module 220 must make decisions within one or more time constraints to ensure that the determined operational commands reflect the most recently captured state (e.g., operational state and/or environmental state) of the autonomous vehicle 100. Accordingly, the automation module 220, a hypervisor 228, the guest operating system 216 of the virtual machine 229, an external monitoring service, or another entity may determine that the processing unit has failed to provide, within the predefined time limit, the output associated with processing the sensor data.

Figure 9:
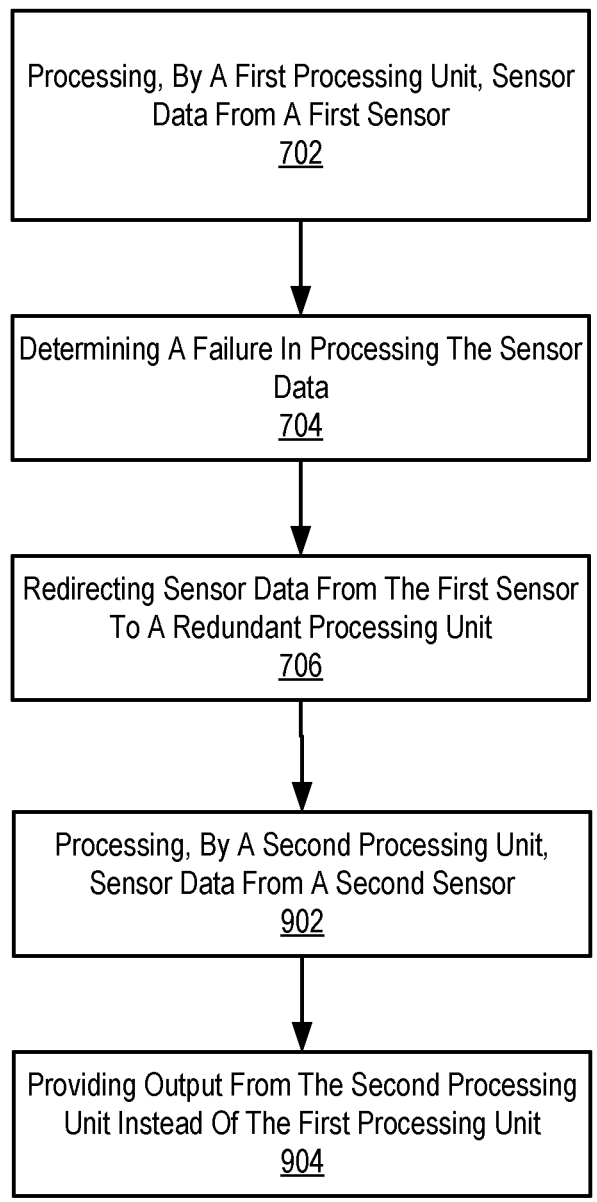
FIG. 9 is a flowchart of an example method for a redundant processing fabric in an autonomous vehicle.

For further explanation, FIG. 9 sets forth a flow chart illustrating an exemplary method for a redundant processing fabric in an autonomous vehicle that includes processing 702, by a first processing unit, sensor data from a first sensor; determining 704 a failure in processing the sensor data; and redirecting 706 sensor data from the first sensor to a redundant processing unit. FIG. 9 differs from FIG. 7 in that the method of FIG. 9 includes processing 902, by a second processing unit, sensor data from a second sensor (e.g., a sensor 212). The second sensor may comprise a sensor from the plurality of sensors that includes the first sensor. Accordingly, the second sensor and the first sensor may correspond to the same sensing space 608. The second processing unit and the first processing unit may be included in the same CPU package 204 or different CPU packages 204. The first processing unit and second processing unit may each execute instances of a process configured to process sensor data (e.g., configured to process sensor data from the particular sensing space). Although FIG. 9 shows processing, by the second processing unit, the sensor data from the second sensor after redirecting sensor data from the first sensor to the redundant processing unit, it is understood that the second processing unit may process sensor data from the second sensor concurrent to (e.g., in parallel) with the first sensor processing the sensor data from the first sensor (e.g., before failure). In such an example, the switched fabric 213 provides, before the failure, a first communications path between the first sensor and the first processing unit and a second communications path between the second sensor and the second processing unit, and provides, after the failure, the second communications path and a third communications path between the first sensor and the redundant processing unit.

FIG. 9 further differs from FIG. 7 in that the method of FIG. 9 further comprises providing 904, in response to the failure, output from the second processing unit instead of the first processing unit. For example, redundant processing unit processing the sensor data from the first sensor may require time to build up an adequate history (e.g., through cached data, instruction pipelines, stacks, etc.) before output may be provided from the redundant processing unit. Accordingly, by providing output from the second processing unit, a continual output of processed sensor data associated with the sensing space 608 to a receiving process is maintained.

In view of the explanations set forth above, readers will recognize that the benefits of a redundant processing fabric in an autonomous vehicle according to embodiments of the present disclosure include:

The redundant processing fabric allows for performance to be maintained even in the event of the failure of many processing units.

Multiple redundant processing pathways between sensors and processing units are maintained in parallel, allowing for real-time constraints for autonomous vehicles to be satisfied in the event of a processing unit failure.

Exemplary embodiments of the present disclosure are described largely in the context of a fully functional computer system for a redundant processing fabric in an autonomous vehicle. Readers of skill in the art will recognize, however, that the present disclosure also may be embodied in a computer program product disposed upon computer readable storage media for use with any suitable data processing system. Such computer readable storage media may be any storage medium for machine-readable information, including magnetic media, optical media, or other suitable media. Examples of such media include magnetic disks in hard drives or diskettes, compact disks for optical drives, magnetic tape, and others as will occur to those of skill in the art. Persons skilled in the art will immediately recognize that any computer system having suitable programming means will be capable of executing the steps of the method of the disclosure as embodied in a computer program product. Persons skilled in the art will recognize also that, although some of the exemplary embodiments described in this specification are oriented to software installed and executing on computer hardware, nevertheless, alternative embodiments implemented as firmware or as hardware are well within the scope of the present disclosure.

The present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be understood that any of the functionality or approaches set forth herein may be facilitated at least in part by artificial intelligence applications, including machine learning applications, big data analytics applications, deep learning, and other techniques. Applications of such techniques may include: machine and vehicular object detection, identification and avoidance; visual recognition, classification and tagging; algorithmic financial trading strategy performance management; simultaneous localization and mapping; predictive maintenance of high-value machinery; prevention against cyber security threats, expertise automation; image recognition and classification; question answering; robotics; text analytics (extraction, classification) and text generation and translation; and many others.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method for a redundant processing fabric in an autonomous vehicle, comprising:
   processing, by a first processing unit of a plurality of processing units, sensor data from a first sensor of a plurality of sensors, where the plurality of processing units are coupled to the plurality of sensors via a switched fabric, wherein the plurality of processing units and plurality of sensors are included in the autonomous vehicle, wherein the sensor data corresponds to an environment external to the autonomous vehicle;
   determining a failure in processing the sensor data by the first processing unit;
   severing, in the switched fabric, a first communications path between the first sensor and the first processing unit; and
   establishing, in the switched fabric, a second communications path between the first sensor and a redundant processing unit.

2. The method of claim 1, wherein the redundant processing unit comprises a processing unit not designated for processing sensor data from any of the plurality of sensors prior to the failure.

3. The method of claim 1, wherein determining the failure in processing the sensor data comprises determining that the first processing unit has failed to provide, within a predefined time threshold, an output associated with processing the sensor data from the first sensor.

4. The method of claim 1, further comprising processing, by the redundant processing unit, the sensor data from the first sensor.

5. The method of claim 1, further comprising processing, by a second processing unit of the plurality of processing units, sensor data from a second sensor of the plurality of sensors, wherein the first sensor and the second sensor correspond to a same sensing space.

6. The method of claim 5, further comprising providing, in response to determining the failure, output from the second processing unit instead of the first processing unit.

7. An apparatus for a redundant processing fabric in an autonomous vehicle, the apparatus configured to perform steps comprising:
   processing, by a first processing unit of a plurality of processing units, sensor data from a first sensor of a plurality of sensors, where the plurality of processing units are coupled to the plurality of sensors via a switched fabric, wherein the plurality of processing units and plurality of sensors are included in the autonomous vehicle, wherein the sensor data corresponds to an environment external to the autonomous vehicle;
   determining a failure in processing the sensor data by the first processing unit;
   severing, in the switched fabric, a first communications path between the first sensor and the first processing unit; and
   establishing, in the switched fabric, a second communications path between the first sensor and a redundant processing unit.

8. The apparatus of claim 7, wherein the redundant processing unit comprises a processing unit not designated for processing sensor data from any of the plurality of sensors prior to the failure.

9. The apparatus of claim 7, wherein determining the failure in processing the sensor data comprises determining that the first processing unit has failed to provide, within a predefined time threshold, an output associated with processing the sensor data from the first sensor.

10. The apparatus of claim 7, wherein the steps further comprise processing, by the redundant processing unit, the sensor data from the first sensor.

11. The apparatus of claim 7, wherein the steps further comprise processing, by a second processing unit of the plurality of processing units, sensor data from a second sensor of the plurality of sensors, wherein the first sensor and the second sensor correspond to a same sensing space.

12. The apparatus of claim 11, wherein the steps further comprise providing, in response to determining the failure, by the second processing unit, the processed sensor data.

13. An autonomous vehicle with a redundant processing fabric, the autonomous vehicle comprising an apparatus configured to perform steps comprising:
   processing, by a first processing unit of a plurality of processing units, sensor data from a first sensor of a plurality of sensors, where the plurality of processing units are coupled to the plurality of sensors via a switched fabric, wherein the plurality of processing units and plurality of sensors are included in the autonomous vehicle, wherein the sensor data corresponds to an environment external to the autonomous vehicle;
   determining a failure in processing the sensor data by the first processing unit;
   severing, in the switched fabric, a first communications path between the first sensor and the first processing unit; and
   establishing, in the switched fabric, a second communications path between the first sensor and a redundant processing unit.

14. The autonomous vehicle of claim 13, wherein the redundant processing unit comprises a processing unit not designated for processing sensor data from any of the plurality of sensors prior to the failure.

15. The autonomous vehicle of claim 13, wherein determining the failure in processing the sensor data comprises determining that the first processing unit has failed to provide, within a predefined time threshold, an output associated with processing the sensor data from the first sensor.

16. The autonomous vehicle of claim 12, wherein the steps further comprise processing, by a second processing unit of the plurality of processing units, sensor data from a second sensor of the plurality of sensors, wherein the first sensor and the second sensor correspond to a same sensing space.

17. A computer program product disposed upon a non-transitory computer readable medium, the computer program product comprising computer program instructions for a redundant processing fabric in an autonomous vehicle that, when executed, cause a computer system to carry out the steps of:
   processing, by a first processing unit of a plurality of processing units, sensor data from a first sensor of a plurality of sensors, where the plurality of processing units are coupled to the plurality of sensors via a switched fabric, wherein the plurality of processing units and plurality of sensors are included in the autonomous vehicle, wherein the sensor data corresponds to an environment external to the autonomous vehicle;
   determining a failure in processing the sensor data by the first processing unit;

severing, in the switched fabric, a first communications path between the first sensor and the first processing unit; and establishing, in the switched fabric, a second communications path between the first sensor and a redundant processing unit.

\* \* \* \* \*